(12) United States Patent
Seol

(10) Patent No.: US 8,827,061 B2
(45) Date of Patent: Sep. 9, 2014

(54) TWIN CLUTCH HUB

(75) Inventor: Marn Taek Seol, Kyung Gi-Do (KR)

(73) Assignee: J. C. Lin, Kaohsiung (TW)

(*) Notice: Subject to any disclaimer, the term of this patent is extended or adjusted under 35 U.S.C. 154(b) by 209 days.

(21) Appl. No.: 13/360,095

(22) Filed: Jan. 27, 2012

(65) Prior Publication Data

US 2013/0037369 A1 Feb. 14, 2013

(30) Foreign Application Priority Data

Aug. 10, 2011 (TW) ............................... 100214787 U

(51) Int. Cl.
*F16D 23/00* (2006.01)
*F16D 41/30* (2006.01)

(52) U.S. Cl.
CPC ..................................... *F16D 41/30* (2013.01)
USPC .......................................................... 192/64

(58) Field of Classification Search
USPC ...................... 192/64, 45.001, 41 R, 31, 45.1
See application file for complete search history.

(56) References Cited

U.S. PATENT DOCUMENTS

| | | | | | |
|---|---|---|---|---|---|
| 4,328,882 | A | * | 5/1982 | Isobe | 192/64 |
| 8,276,731 | B2 | * | 10/2012 | Chen | 192/64 |
| 8,443,951 | B1 | * | 5/2013 | Hsieh | 192/64 |
| 2007/0089960 | A1 | * | 4/2007 | Kanehisa | 192/64 |
| 2010/0252389 | A1 | * | 10/2010 | French | 192/64 |

* cited by examiner

*Primary Examiner* — Saul Rodriguez
*Assistant Examiner* — David J Hlavka
(74) *Attorney, Agent, or Firm* — Muncy, Geissler, Olds & Lowe, P.C.

(57) ABSTRACT

A twin clutch hub includes a one-way roller clutch and a ratchet pawl based clutch mounted to a bicycle hub. A chain wheel seat receives driving power from a bicycle rear wheel and is in operative coupling with the one-way roller clutch and the ratchet pawl based clutch, which are in turn operatively coupled to the hub. When the ratchet pawl based clutch shows a returning side tooth backlash that is greater than or equal to an angle of deformation of the one-way roller clutch, transmission is performed with the one-way roller clutch to make backlash approximating zero. When the angle of returning side tooth backlash of the ratchet pawl based clutch is smaller than or equal to the angle of deformation of the one-way roller clutch, transmission is performed through both the one-way roller clutch and the ratchet pawl based clutch to realize high efficiency twin clutch hub.

3 Claims, 7 Drawing Sheets

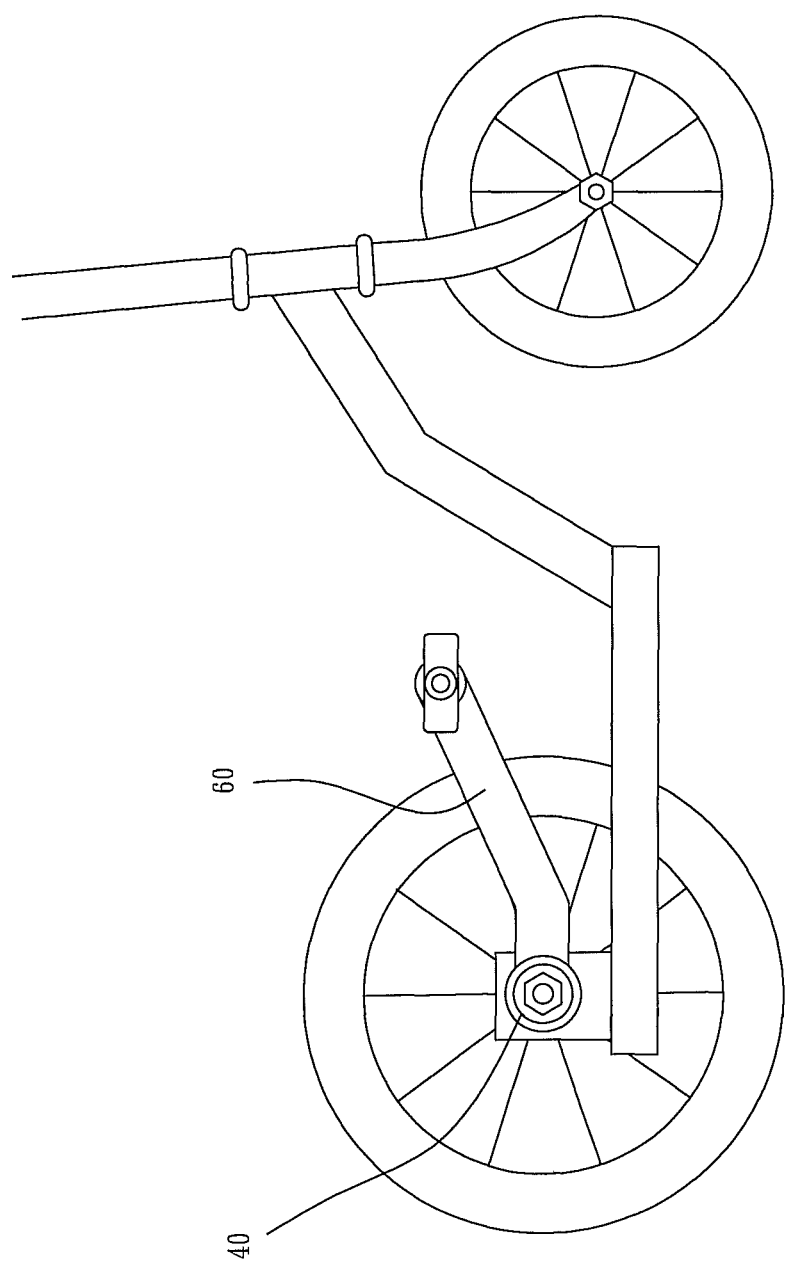

TWIN CLUTCH HUB

BACKGROUND OF THE INVENTION

1. Field of the Invention

The present invention relates to the field of bicycle, and in particular to a twin clutch hub, which features both great output of torque power provided by a ratchet wheel and gap-free non-loading transmission provided by a one-way roller clutch.

2. The Related Arts

To cope with high fuel price era and to suit the need of environment conservation and reduction of air pollution, using bicycle is now increasing. Further, large cities around the world are all ambitious in developing an easy-borrow-easy-return project for bicycles, which allows a user to borrow a bicycle at one site and to return the bicycle at another site in order to cut down the use of automobiles and motorcycles. Apparently, bicycle popularization is now upgraded to national level. In addition, besides being a transportation measure, the bicycle is also a measure of exercise, for pedaling a bicycle is actual a kind of exercise.

Some of the currently available bicycles are provided with a ratchet pawl based clutch and the ratchet pawl based clutch has a significant returning side tooth backlash. This lowers down the operation efficiency and also causes uncomfortable feeing. Further, such a significant returning side tooth backlash is of even greater influence on the vertical treading type bicycle pedals. Apparently, further improvement is desired.

Furthermore, the bicycles that are currently available in the market do not use one-way roller clutches, simply because the one-way roller clutches can only stand for reduced torque powers. Consequently, the one-way roller clutch is of no use in situations where a great torque power is needed, such as uphill riding.

SUMMARY OF THE INVENTION

An objective of the present invention is to provide a twin clutch hub, which comprises a wheel axle of bicycle hub to which a one-way roller clutch and a ratchet pawl based clutch are mounted. A chain wheel seat is operatively coupled to a driving power of a toothed wheel of bicycle rear wheel. The chain wheel seat is operatively coupled to the ratchet pawl based clutch and the one-way roller clutch. The ratchet pawl based clutch and the one-way roller clutch are the respectively in operative coupling with the hub. When the ratchet pawl based clutch shows an angle of returning side tooth backlash that is greater than or equal to an angle of deformation of the one-way roller clutch, the one-way roller clutch is set to perform transmission and making the returning side tooth backlash approximating zero and when the angle of returning side tooth backlash of the ratchet pawl based clutch is less than or equal to the angle of deformation of the one-way roller clutch, the one-way roller clutch and the ratchet pawl based clutch cooperate the collectively drive the hub thereby realizing a high efficiency twin clutch hub.

BRIEF DESCRIPTION OF THE DRAWINGS

The present invention will be apparent to those skilled in the art by reading the following description of a preferred embodiment thereof, with reference to the attached drawings, wherein:

FIG. 7 is a schematic view illustrating an application of the embodiment of the present invention, in which the power of bicycle is transmitted through rocking arm pedals.

DETAILED DESCRIPTION OF THE PREFERRED EMBODIMENT

Figure 1:
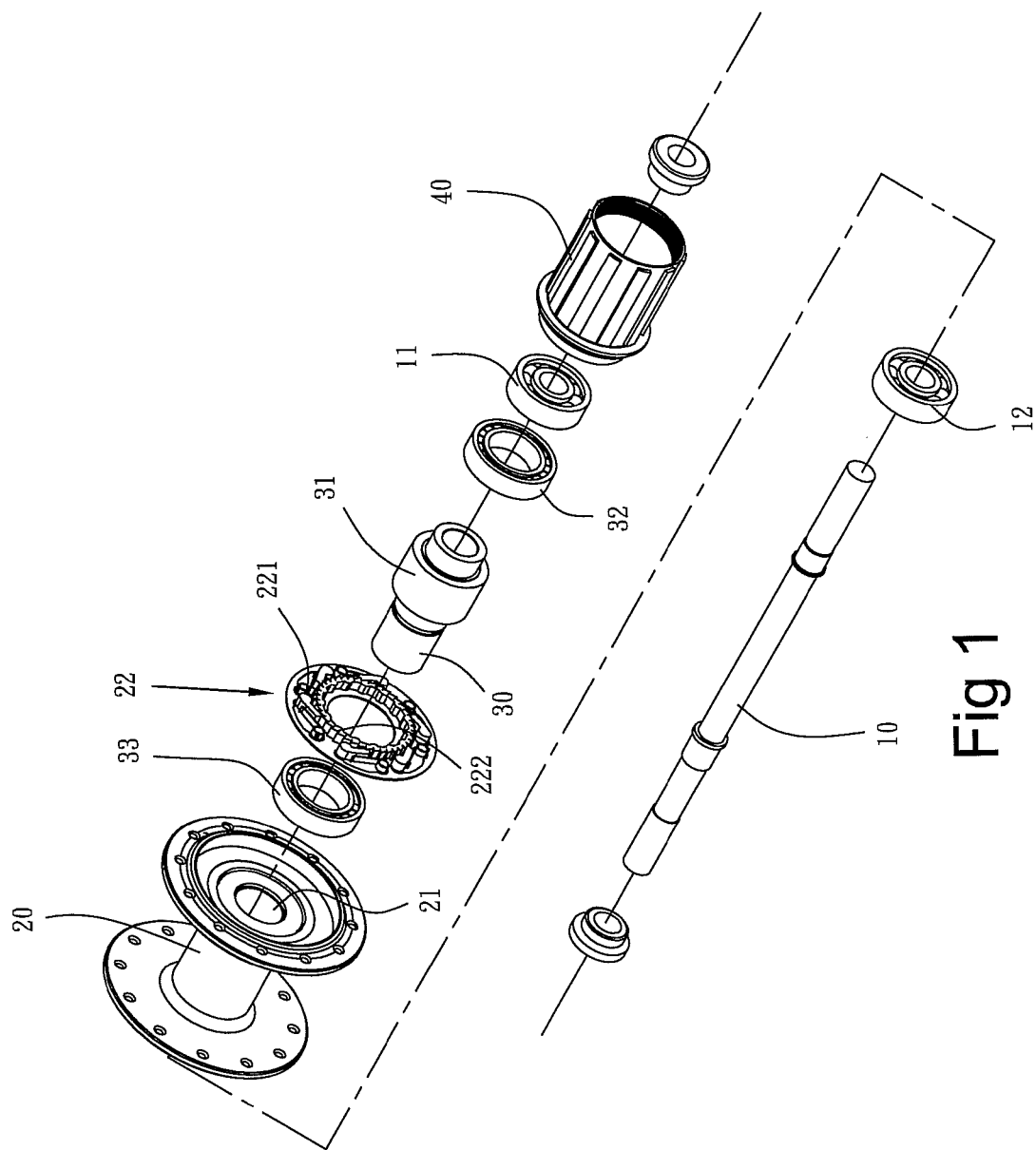
FIG. 1 is an exploded view of an embodiment of the present invention.
Figure 2:
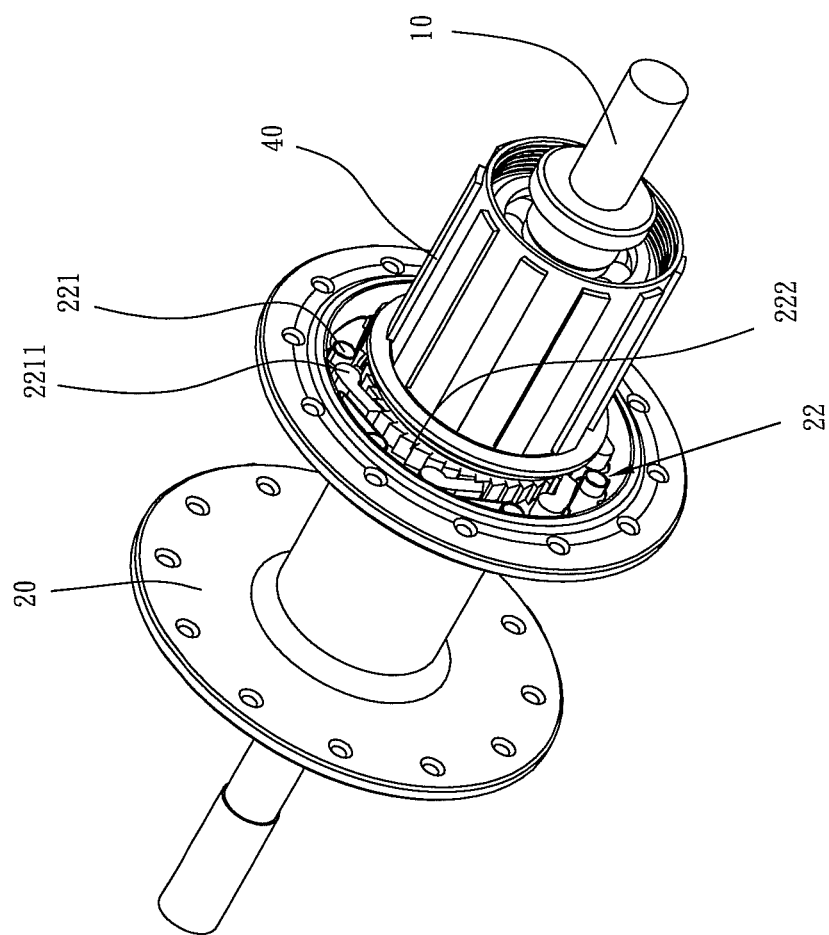
FIG. 2 is a perspective view, in an assembled form, of the embodiment of the present invention.
Figure 3:
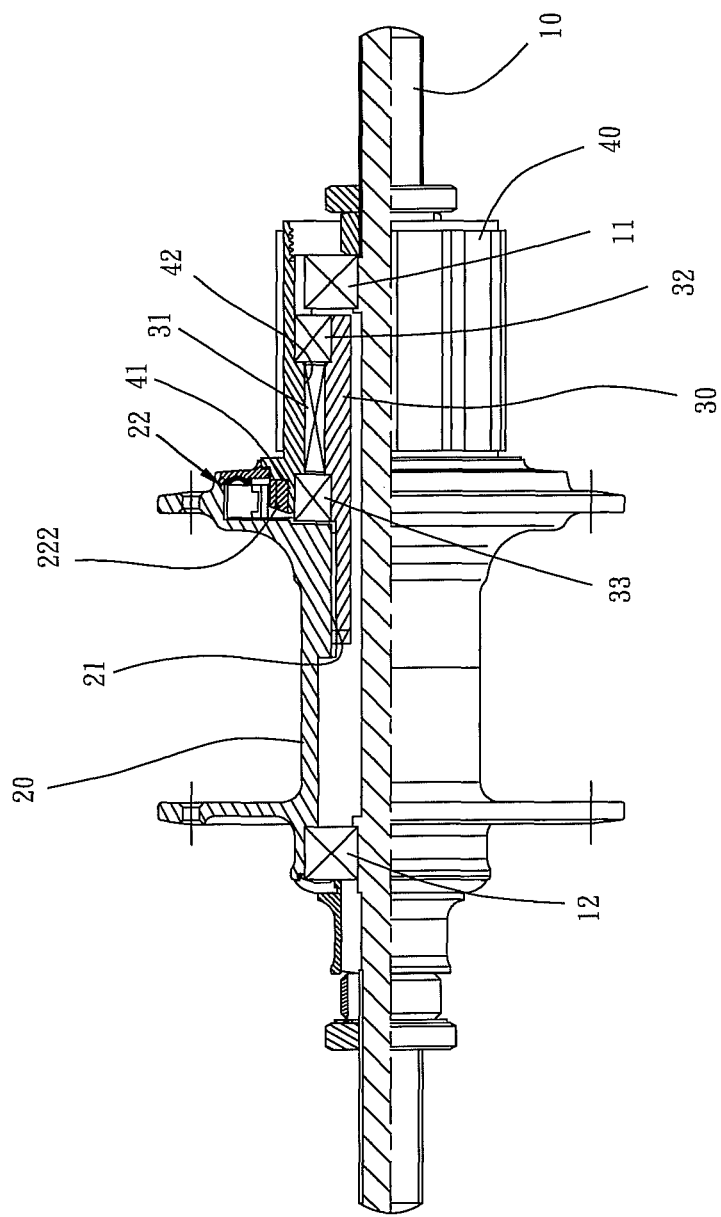
FIG. 3 is a cross-sectional view of the embodiment of the present invention.

With reference to FIGS. 1-3, an exploded view, a perspective view, and a cross-sectional view of a preferred embodiment of the present invention are respectively shown. The present invention provides a two clutch hub, which comprises a wheel axle 10, a hub casing 20, a clutch shaft 30, and a chain wheel seat 40, all these components will be further described.

The hub casing 20 is supported on the wheel axle 10 by two bearings 11, 12 so that the hub casing 20 is allowed to freely rotate. The hub casing 20 has an end surface that is recessed and receives a ratchet pawl component 221 of a ratchet wheel 22 mounted therein.

The clutch shaft 30 is fit over and coupled to the wheel axle 10 and the clutch shaft 30 is coupled to an inner circumferential surface 21 of the hub casing 20. The clutch shaft 30 has an outer circumferential surface to which a one-way roller clutch 31 is coupled. The one-way roller clutch 31 has opposite ends where two bearings 32, 33 are respectively mounted.

The chain wheel seat 40 has an end forming a mounting section 41 to which a toothed wheel 222 of the ratchet wheel 22 is mounted. The chain wheel seat 40 has an inner circumferential surface 42 that is operatively coupled to the one-way roller clutch 31. The toothed wheel 222 is mounted beside the ratchet pawl component 221 of the ratchet wheel 22 to thereby constitute a complete ratchet wheel 22.

The present invention relates to a bicycle hub, and especially, that allows of freewheeling of a bicycle freewheel in a single direction.

The driving of the one-way freewheel is realized by having a pawl bar 2211 of the ratchet pawl component 221 engaging the toothed wheel 222 to allow driving power to be transmitted through the toothed wheel 222 and the ratchet pawl component 221 to the hub casing 20. And, during non-loaded reverse rotation, the pawl bar 2211 is pushed away by slopes of the toothed wheel 222 to allow the non-loaded rotation of the toothed wheel 222. For an example that the toothed wheel 222 has forty-one (41) teeth and six pawl bars 2211 are provided, the angle of returning side tooth backlash approximates 1.45 degrees. The greater the returning side tooth backlash is, the larger the impact acting on the pawl bar 2211 and the toothed wheel 222 will be. For vertical threading type pedals, the repeated driving power makes the returning side tooth backlash more significant and loss of power results. Also, there is also an imbalance and uncomfortable feeling in traveling.

It would be idea if the returning side tooth backlash for the one-way direction of the returning side tooth backlash can be made approximating zero. The clutch provided in the present invention is to make use of the advantage of one-way roller clutch 31 of which the returning side tooth backlash is almost zero, and a ratchet wheel 22 that has better capability of supporting torque power is used in combination, so that the advantages of both are preserved. For regular riding, the returning side tooth backlash is set to zero and the one-way roller clutch 31 is used. In a situation where the torque power needs to be increased, the torque power transmitted through the one-way roller clutch 31 and that transmitted through the ratchet wheel 22 are combined, but with a returning side tooth backlash that approximates zero. The present invention converts the hub flywheel into a high efficiency twin clutch hub.

When the hub flywheel uses combined torque power of the ratchet wheel 22 and the one-way roller clutch 31, the one-way roller clutch 31 provides the advantage that the returning side tooth backlash approximates zero and the ratchet wheel 22 provides the advantage that has better support to the torque power, whereby the combination is a twin clutch hub having high efficiency and returning side tooth backlash approximating zero.

When the angle of elastic deformation of the one-way roller clutch 31 is smaller than or equal to the returning side tooth backlash of the ratchet wheel 22, transmission of power is made through the one-way roller clutch 31 having a returning side tooth backlash approximating zero to the freewheel.

When the angle of elastic deformation of the one-way roller clutch 31 is greater than or equal to the returning side tooth backlash of the ratchet wheel 22, the transmission of power is made through a combination of the one-way roller clutch 31 and the ratchet wheel 22 to the freewheel. In respect of the design of the present invention, if the overloading angle of the one-way roller clutch 31 is set to 1.9 degrees, then the returning side tooth backlash of the ratchet wheel 22 is selected to 1.45 degrees, whereby in the 1.9 degree range, the one-way roller clutch 31 is always making transmission in such a condition that the returning side tooth backlash approximates zero. Before the one-way roller clutch 31 gets overloaded, the ratchet wheel 22 is put into operation to work with the one-way roller clutch 31 in order to prevent the occurrence of overloading and also to achieve high efficiency transmission.

Figure 4:
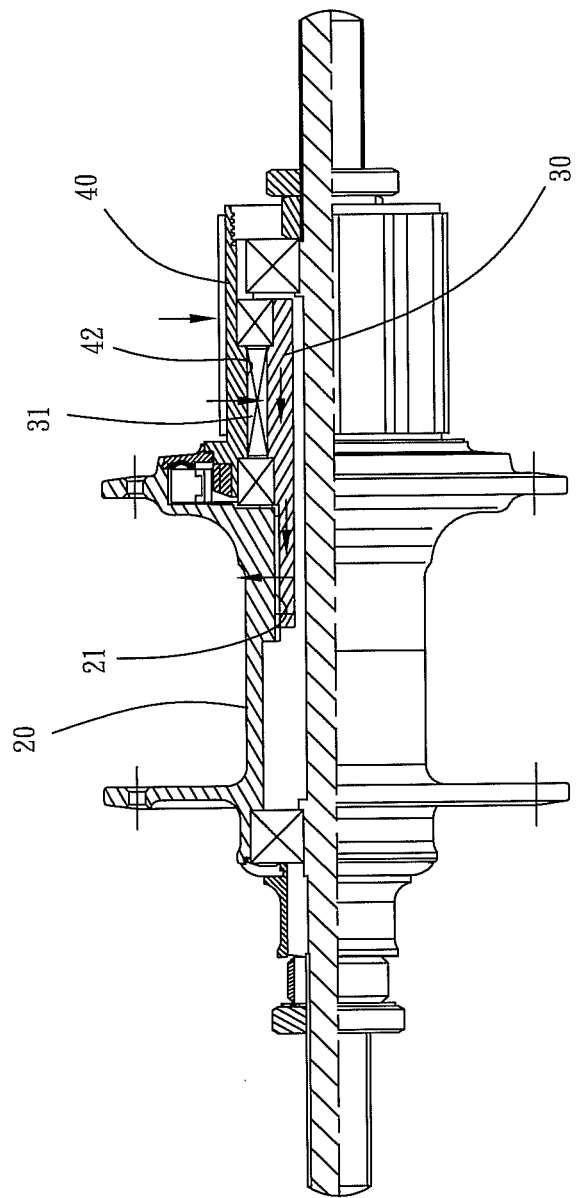
FIG. 4 is a cross-sectional illustrating transmission made with the embodiment of the present invention, in which the power of a chain wheel seat is transmitted through a one-way roller clutch to a hub, realizing a returning side tooth backlash approximating zero.
Figure 5:
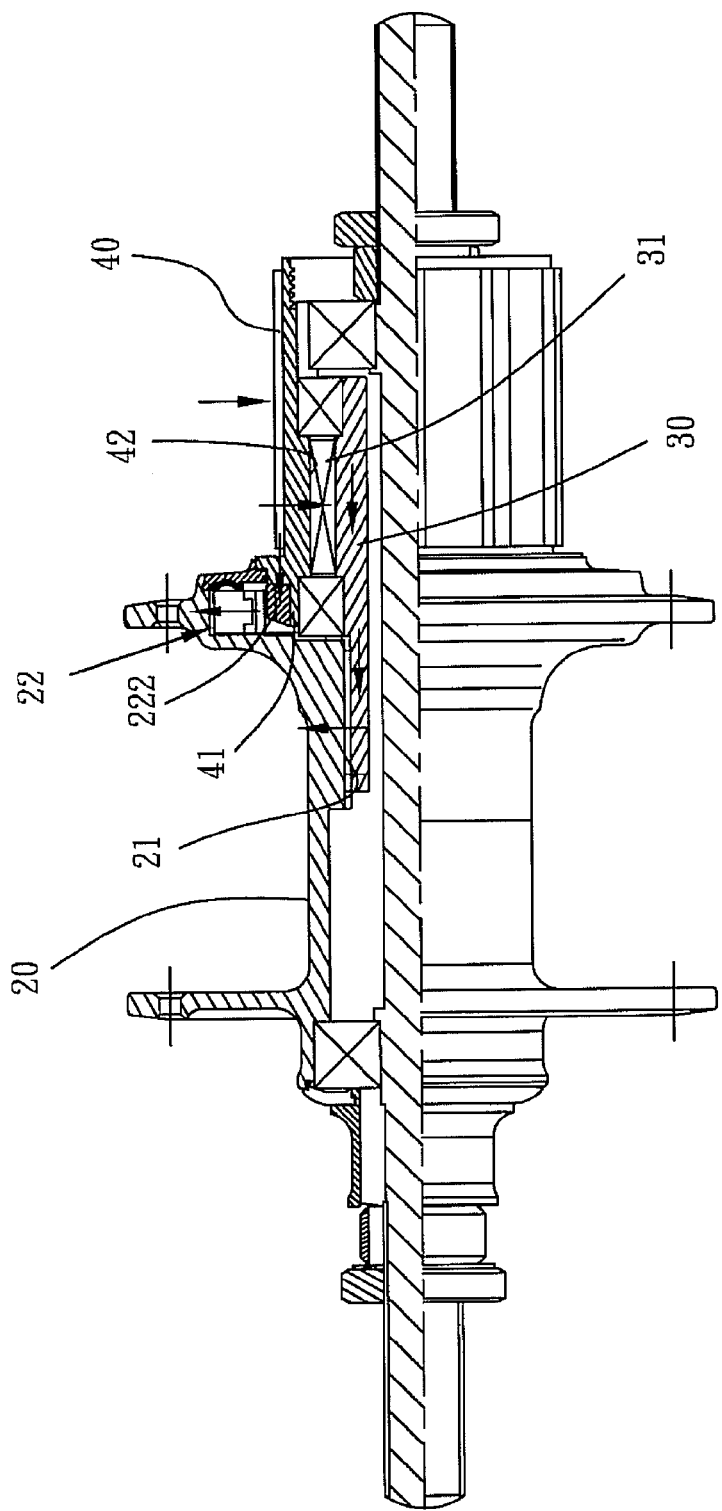
FIG. 5 is a cross-sectional illustrating transmission made with the embodiment of the present invention, in which the power of a chain wheel seat is transmitted through a one-way roller clutch and a ratchet wheel to a hub, realizing the greatest efficiency and making a returning side tooth backlash approximating zero.

Referring to FIGS. 4 and 5, the chain wheel seat 40 transmits the power of the bicycle through the inner circumferential surface 42 of the chain wheel seat 40 and the one-way roller clutch 31 to allow the returning side tooth backlash for the transmission to approximate zero and can thus be transmitted through the clutch shaft 30 and the inner circumferential surface 21 of the hub casing 20 to reach the hub casing 20.

Alternatively, the chain wheel seat 40 transmits the power of the bicycle through the inner circumferential surface 42 of the chain wheel seat 40 and the mounting section 41 of the chain wheel seat 40 and the toothed wheel 222 of the ratchet wheel 22 to have the one-way roller clutch 31 cooperating with the ratchet wheel 22 through the clutch shaft 30 and the inner circumferential surface 21 of the hub casing 20 to cooperatively rotate the hub casing 20 and make the returning side tooth backlash approximating zero and showing improved efficiency for transmission.

Figure 6:
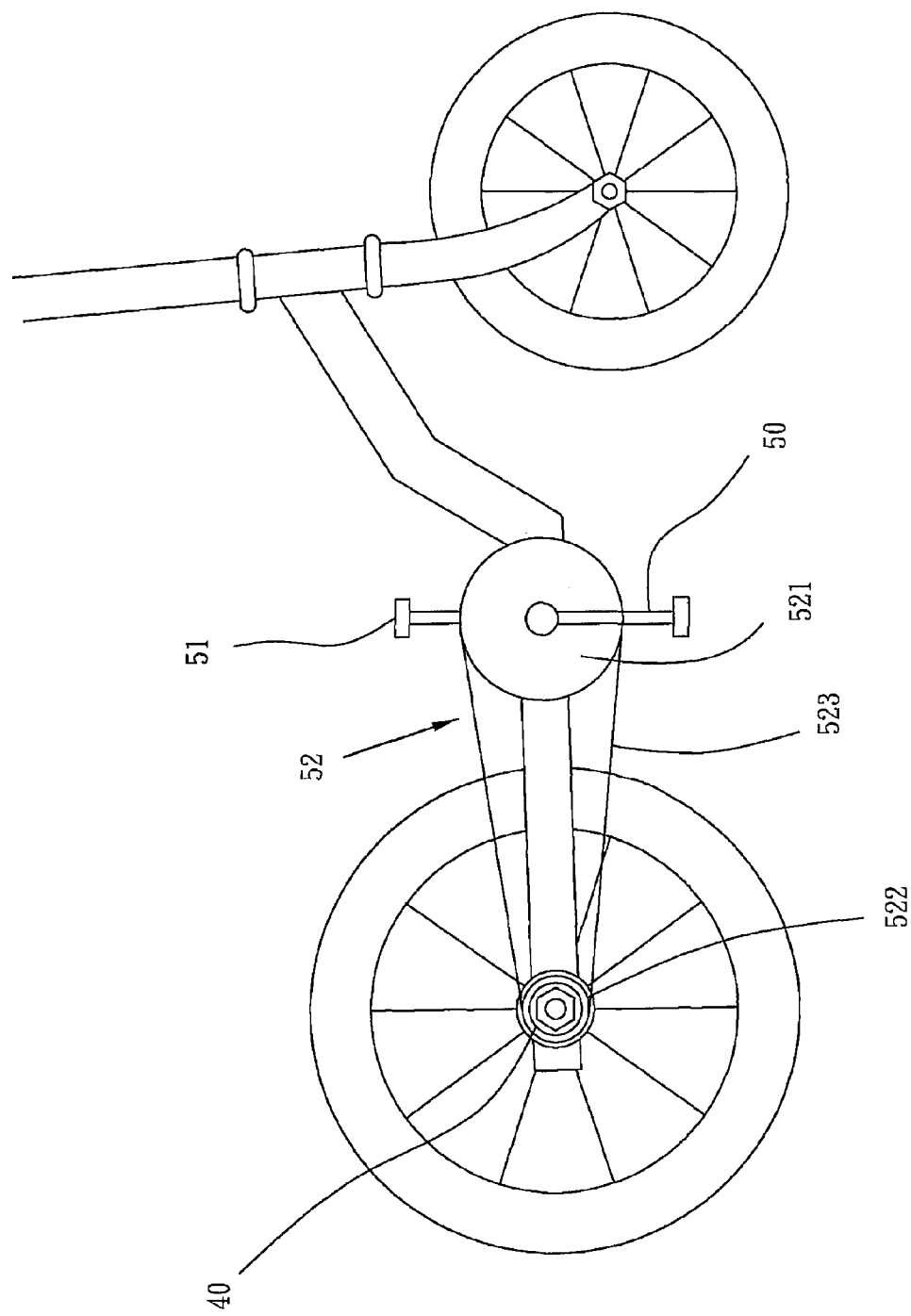
FIG. 6 is a schematic view illustrating an application of the embodiment of the present invention, in which the power of bicycle is transmitted through crank arms, pedals, and a chain and chain wheel set.

Referring to FIG. 6, the chain wheel seat 40 is coupled to two pedals 50 through crank arms 50 for transmission of power. The crank arms 50 are coupled to a chain wheel 521 of a chain and chain wheel set 52 and an additional chain wheel 522 is fixed to the chain wheel seat 40 so that the two chain wheels 521, 522 are operatively connected to each other with a chain 523. Treading the two pedals 51 causes the crank arms 50 to rotate and the power is transmitted through the chain and chain wheel set 52 to drive the chain wheel seat 40.

Referring to FIG. 7, the chain wheel seat 40 can be alternatively provided with two rocking arm pedals 60 that are capable of vertical reciprocal movement. An end of each of the rocking arm pedals 60 is fixed to the chain wheel seat 40 and drives the chain wheel seat 40 to rotate.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A twin clutch hub, comprising:
a hub casing, which is rotatably supported on and around a wheel axle and has an end surface that is recessed to form a socket that receives and retains therein a pawl member;
a clutch shaft, which is rotatably fit around and has an end received in and fixed to an inner circumferential surface of the hub casing and an opposite end over which a one-way roller clutch is fit; and
a chain wheel seat, which has an end forming a mounting section to which a toothed wheel is mounted, the chain wheel seat having an inner circumferential surface fit over and fixed to the one-way roller clutch in such a way that the toothed wheel is engageable by the pawl member to collectively serve as a ratchet to form a complete ratchet wheel, whereby transmission of bicycle power is achievable in a first manner where returning side tooth backlash is zero and the chain wheel seat transmits the bicycle power through the one-way roller clutch only and transmission of bicycle power is alternatively achievable in a second manner where returning side tooth backlash is zero and the chain wheel seat transmits the bicycle power through the one-way roller clutch and the ratchet wheel.

2. The twin clutch hub as claimed in claim 1, wherein the chain wheel seat is driven by crank arms coupled to pedals, the crank arms being coupled to a chain wheel of a chain and chain wheel set, an additional chain wheel being fixed to the chain wheel seat, the chain wheels being operatively coupled by a chain, whereby treading the pedals causes the crank arms to rotate and power is transmitted through the chain and chain wheel set to drive the chain wheel seat.

3. The twin clutch huh as claimed in claim 1, wherein the chain wheel seat is coupled to rocking arm pedals that make vertical reciprocal transmission, each of the rocking arm pedals having an end fixed to the chain wheel seat to drive the chain wheel seat to rotate.

\* \* \* \* \*